United States Patent
Alp et al.

(10) Patent No.: US 8,051,546 B2
(45) Date of Patent: Nov. 8, 2011

(54) METHOD FOR DETERMINING IF A FUEL CELL STACK IS OVERHEATING USING STACK END PLATE TEMPERATURE SENSORS

(75) Inventors: Abdullah B. Alp, West Henrietta, NY (US); David A. Arthur, Honeoye Falls, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/909,696

(22) Filed: Oct. 21, 2010

(65) Prior Publication Data

US 2011/0033766 A1 Feb. 10, 2011

Related U.S. Application Data

(62) Division of application No. 11/640,087, filed on Dec. 15, 2006, now Pat. No. 7,862,949.

(51) Int. Cl.
*H01M 8/04* (2006.01)
(52) U.S. Cl. ......... 29/442; 429/433; 429/428; 429/434; 429/437
(58) Field of Classification Search .......... 429/442, 429/433, 428; *H01M 8/04*
See application file for complete search history.

(56) References Cited

U.S. PATENT DOCUMENTS

| | | | |
|---|---|---|---|
| 2003/0180590 A1 * | 9/2003 | Hase et al. | 429/26 |
| 2005/0287406 A1 * | 12/2005 | Takahashi | 429/24 |
| 2007/0122669 A1 * | 5/2007 | Kusano et al. | 429/26 |
| 2007/0298297 A1 * | 12/2007 | Arthur et al. | 429/24 |

FOREIGN PATENT DOCUMENTS

WO WO 2005034272 A1 * 4/2005

* cited by examiner

*Primary Examiner* — Jennifer Michener
*Assistant Examiner* — Heng Chan
(74) *Attorney, Agent, or Firm* — John A. Miller; Miller IP Group, PLC

(57) ABSTRACT

A method for determining whether a fuel cell stack is overheating. The method measures the temperature of end cells in the stack using end cell temperature sensors, and calculates an average end cell temperature based on the end cell temperature measurements. The method also measures the temperature of a cooling fluid being output from the fuel cell stack. The method determines if any of the measured end cell temperatures are outlying by comparing each end cell temperature measurement to the average. The method determines that the cooling fluid outlet temperature sensor has possibly failed if the cooling fluid outlet temperature is greater than the average end cell temperature and the cooling fluid outlet temperature minus the average end cell temperature is greater than a predetermined temperature value.

17 Claims, 2 Drawing Sheets

METHOD FOR DETERMINING IF A FUEL CELL STACK IS OVERHEATING USING STACK END PLATE TEMPERATURE SENSORS

CROSS-REFERENCE TO RELATED APPLICATION

This application is a Divisional application of U.S. patent application Ser. No. 11/640,087, filed Dec. 15, 2006, titled "Fuel Cell Reliability Improvement by Using Stack End Plate Temperature Sensors."

BACKGROUND OF THE INVENTION

1. Field of the Invention

This invention relates generally to a method for determining whether a fuel cell stack is overheating and, more particularly, to a method for determining whether a fuel cell stack is overheating using end cell temperature sensors.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

For automotive applications, it typically takes about 400 fuel cells to provide the desired power. Because so many fuel cells are required for the stack in automotive fuel cell system designs, the stack is sometimes split into two sub-stacks each including about 200 fuel cells because it is difficult to effectively provide an equal flow of hydrogen gas through 400 fuel cells in parallel.

A fuel cell system typically includes a thermal sub-system for cooling the fuel cell stack to a desired operating temperature. The thermal sub-system includes a pump that pumps a cooling fluid through a coolant loop outside of the stack and cooling fluid flow channels provided within the bipolar plates. A radiator typically cools the hot cooling fluid that exits the stack before it is sent back to the stack.

The end cells in a fuel cell stack typically have a lower performance than the other cells in the stack. Particularly, the end cells are exposed to ambient temperature, and thus have a temperature gradient that causes them to operate at a lower temperature as a result of convective heat losses. Because the end cells are typically cooler than the rest of the cells in the stack, gaseous water more easily condenses into liquid water so that the end cells have a higher relative humidity, which causes water droplets to more readily form in the flow channels of the end cells. Further, at low stack load, the amount of reactant gas flow available to push the water out of the flow channels is significantly reduced. Also, at low stack loads the temperature of the cooling fluid is reduced, which reduces the temperature of the stack and typically increases the relative humidity of the reactant gas flow.

It is known in the art to heat the end cells with resistive heaters positioned between a unipolar plate and an MEA so as to compensate for convective heat losses. These systems typically attempted to maintain the end cell temperature the same as the other cells in the stack by monitoring the temperature of the cooling fluid out of the stack. However, lower cell voltages for the end cells may still be a problem even with the addition of such heaters.

Various components in the fuel cell stack, such as the membranes, may be damaged if the temperature of the stack increases above a certain materials transition temperature, such as 85° C. Therefore, fuel cell systems typically employ a cooling fluid temperature monitoring sub-system that monitors the temperature of the cooling fluid flowing out of the stack so as to prevent the temperature of the stack from increasing above a predetermined temperature. Various factors could cause the temperature of the fuel stack to increase above the predetermined temperature, such as operating the stack at a high load for an extended period of time in a high ambient temperature environment.

In current fuel cell system designs, the cooling fluid temperature is typically measured at the cooling fluid outlet from the stack by a temperature sensor. If the cooling fluid is flowing, the sensor would provide an indication of stack overheating. If the cooling fluid, and thus the fuel cell stack, becomes overheated, the system may be shut down to protect the stack. However, there are potential failure modes where the system might not detect stack overheating, or detect a false overheating condition causing an unnecessary system shut down. These potential failure modes include cooling fluid pump failure, coolant fluid loss, cooling fluid flow blockage and cooling fluid outlet temperature sensor failure. If the system does not detect an overheat condition of the fuel cell stack, the stack membranes may become damaged. However, if the system falsely detects an overheating condition and shuts the system down, system reliability will be lower.

SUMMARY OF THE INVENTION

In accordance with the teachings of the present invention, a method is disclosed for determining whether a fuel cell stack is overheating. The method measures the temperature of end cells in the stack using end plate or end cell temperature sensors, and calculates an average end cell temperature based on the end cell temperature measurements. The method also measures the temperature of a cooling fluid being output from the fuel cell stack. The method determines if any of the measured end cell temperatures are outlying by comparing each end cell temperature measurement to the average. The method determines that the cooling fluid outlet temperature sensor has possibly failed if the cooling fluid outlet temperature is greater than the average end cell temperature and the cooling fluid outlet temperature minus the average end cell temperature is greater than a predetermined temperature value. The method also determines that the fuel cell stack may be overheating if the average end cell temperature is greater than the cooling fluid outlet temperature and the average end cell temperature minus the cooling fluid outlet temperature is greater than a predetermined temperature value.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for determining fuel cell stack overheating by using end temperature sensors is merely exemplary in nature, and is in no way intended to limit the invention or its applications or uses.

Figure 1:
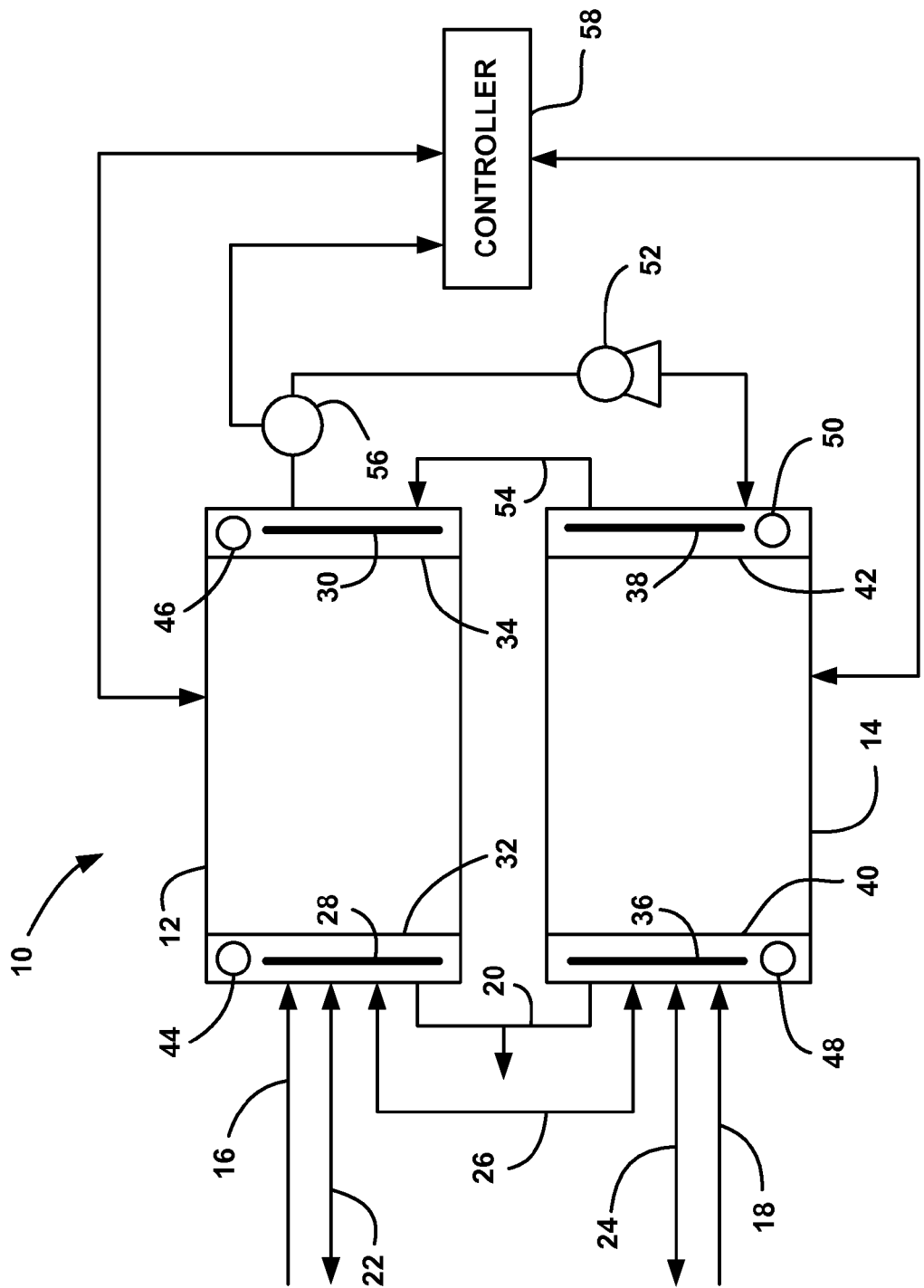
FIG. 1 is a schematic block diagram of a fuel cell system including split stacks having end cell temperature sensors.

FIG. 1 is a schematic block diagram of a fuel cell system 10 including a first split fuel cell stack 12 and a second split fuel cell stack 14. The split stack 12 receives a cathode input airflow on line 16 and the split stack 14 receives a cathode input airflow on line 18, typically from a compressor (not shown). Cathode exhaust gas is output on line 20 from both of the split stacks 12 and 14. The split stacks 12 and 14 employ anode flow shifting where the anode reactant gas flows back and forth through the split stack cells 12 and 14 at a predetermined cycle. Therefore, the anode reactant gas flows in and out of the split stack 12 on line 22 and in and out of the split stack 14 on line 24. An anode connecting line 26 connects the anode channels in the split stacks 12 and 14.

The split stack 12 includes end cell heaters 28 and 30 positioned within end cells 32 and 34, respectively, of the split stack 12. Likewise, the split stack 14 includes end cell heaters 36 and 38 positioned within end cells 40 and 42, respectively, of the split stack 14. The end cell heaters 28, 30, 36 and 38 are positioned at a suitable location in the end cells of the split stacks 12 and 14, such as between the unipolar plate and the adjacent MEA. The end cell heaters 28, 30, 36 and 38 can be any heater suitable for the purposes described herein, such as resistive heaters, well understood to those skilled in the art.

According to the invention, an end plate or end cell temperature sensor 44 is provided in the end cell 32 and an end plate or end cell temperature sensor 46 is provided in the end cell 34 of the split stack 12. Likewise, an end plate or end cell temperature sensor 48 is provided in the end cell 40 and an end plate or end cell temperature sensor 50 is provided in the end cell 42 of the split stack 14. The temperature sensors 44, 46, 48 and 50 can be any temperature sensor suitable for the purposes discussed herein, such as thermocouples.

A pump 52 pumps a cooling fluid through a coolant loop 54 and through cooling fluid flow channels in the split stacks 12 and 14 to control the stack operating temperature, as is well understood in the art. A temperature sensor 56 is provided in the coolant loop 54 at an output from the split stack 12. A controller 58 controls the end cell heaters 28, 30, 36 and 38 and the pump 52, and receives temperature measurement readings from the temperature sensors 44, 46, 48, 50 and 56 in accordance with an algorithm of the present invention, as will be discussed in more detail below.

According to the invention, the end plate temperature sensors 44, 46, 48 and 50 detect whether the split stacks 12 and 14 are overheating. Because the end plate temperature sensors 44, 46, 48 and 50 are closer to the reaction site of the stacks 12 and 14, as compared to the stack cooling fluid outlet temperature sensor 56, stack overheating can be detected faster before membrane damage may occur. Further, unlike the stack cooling fluid outlet temperature sensor 56, the end plate temperature sensors 44, 46, 48 and 50 can detect overheating even when the cooling fluid is not flowing through the stacks 12 and 14. The present invention also uses the end plate temperature sensors 44, 46, 48 and 50 to detect stack coolant outlet temperature sensor failure. If a stack cooling fluid outlet temperature sensor failure occurs, the average end plate temperature calculations are used, and any unnecessary system shut down is avoided.

Figure 2:
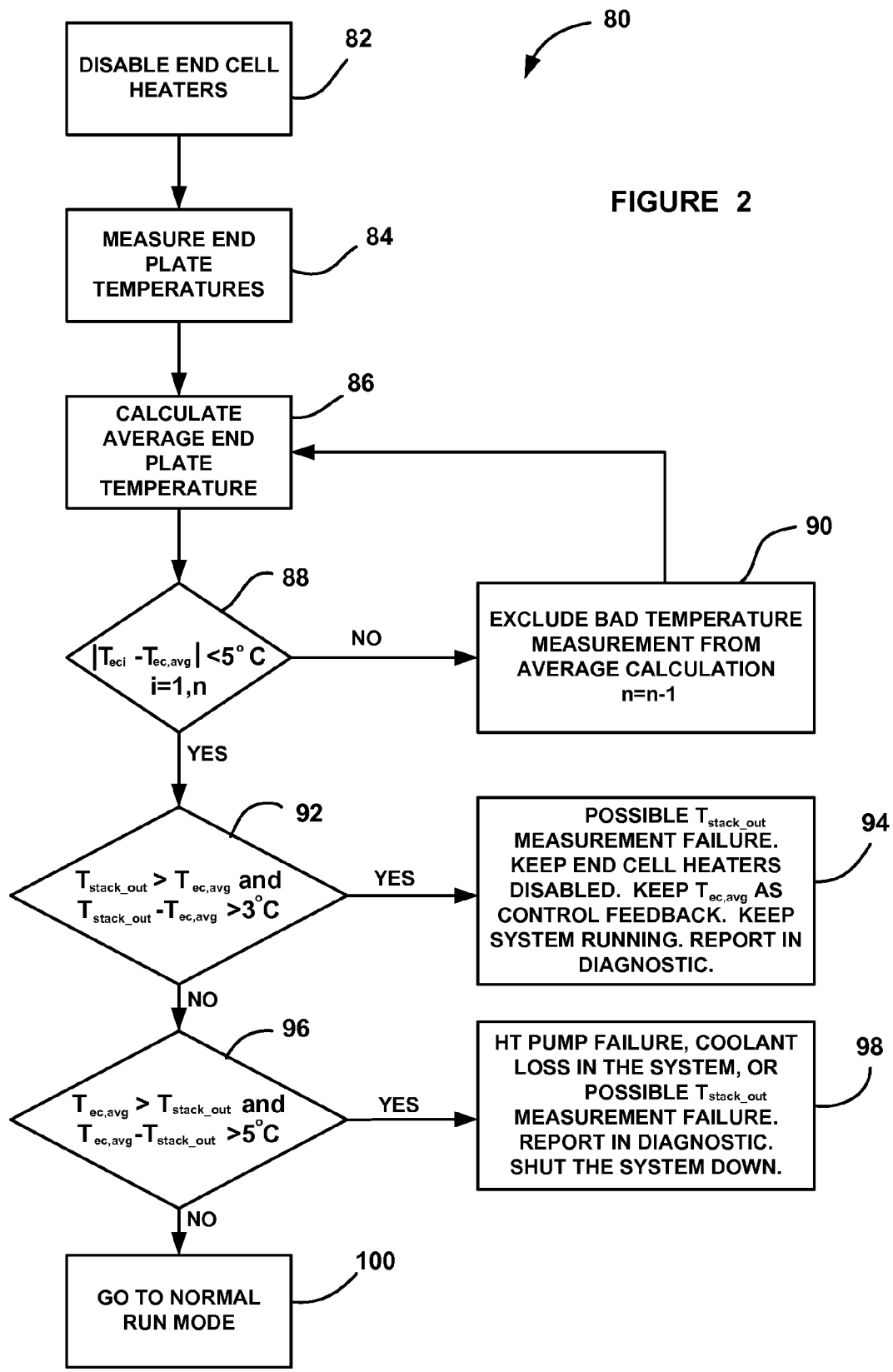
FIG. 2 is a flow chart diagram showing a process for detecting stack overheating using the end cell temperature sensors, according to an embodiment of the present invention.

FIG. 2 is a flow chart diagram 80 showing an algorithm for determining whether the split stacks 12 and 14 are overheating using the end plate temperature sensors 44, 46, 48 and 50, according to an embodiment of the present invention. Although the algorithm is discussed with reference to a split stack design, the algorithm is also applicable to be used in a single stack, where only two end plate temperature sensors would be employed, one in each end cell. The algorithm first disables the end cell heaters 28, 30, 36 and 38 at box 82. The algorithm then measures the temperature of the end cells 32, 34, 40 and 42 using the end plate temperature sensors 44, 46, 48 and 50 at box 84. Based on the four temperature measurements, the algorithm calculates an average end cell temperature $T_{ec,avg}$ at box 86. The algorithm then subtracts the average temperature $T_{ec,avg}$ from each individual measured temperature $T_{ec,i}$ from the end cell temperature sensors 44, 46, 48 and 50, and determines whether the absolute value of the subtracted value is less than a predetermined temperature value, for example, 5° C. at decision diamond 88. If any of the individual measured temperature readings are outside of this threshold, they are excluded as outlying temperature measurements at box 90 to ensure that the average calculation has a small standard of deviation. The algorithm then proceeds back to the box 86 to calculate the average temperature without the temperature readings that were outside of the threshold.

When all of the measured temperature readings from the temperature sensors 44, 46, 48 and 50 are within the threshold at the decision diamond 88, the algorithm determines whether the cooling fluid outlet temperature $T_{stack\_out}$ is greater than the calculated average temperature $T_{ec,avg}$ and subtracts the calculated average temperature $T_{ec,avg}$ from the cooling fluid outlet temperature $T_{stack\_out}$ at decision diamond 92. If the cooling fluid outlet temperature $T_{stack\_out}$ is greater than the calculated average temperature $T_{ec,avg}$ and the cooling fluid outlet temperature $T_{stack\_out}$ minus the average temperature $T_{ec,avg}$ is greater than a predetermined temperature value, for example, 3° C., then the algorithm determines that the cooling fluid temperature sensor 56 may have failed at box 94. In this situation, the algorithm will keep the end cell heaters 28, 30, 36 and 38 disabled, maintain the calculated average temperature $T_{ec,avg}$ as a control feedback, keep the split stacks 12 and 14 running and report the occurrence as a diagnostic.

If the cooling fluid outlet temperature $T_{stack\_out}$ is not greater than the calculated average temperature $T_{ec,avg}$ and/or the cooling fluid outlet temperature measurement $T_{stack\_out}$ minus the calculated average temperature measurement $T_{ec,avg}$ is 3° C. or less at the decision diamond 92, the algorithm then determines whether the calculated average temperature $T_{ec,avg}$ is greater than the cooling fluid outlet temperature measurement $T_{stack\_out}$ and determines whether the calculated average temperature $T_{ec,avg}$ minus the cooling fluid outlet temperature measurement $T_{stack\_out}$ is greater than a predetermined temperature value, for example, 5° C., at decision diamond 96. If the calculated average temperature $T_{ec,avg}$ is greater than the cooling fluid outlet temperature measurement $T_{stack\_out}$ and the calculated average temperature $T_{ec,avg}$ minus the cooling fluid outlet temperature $T_{stack\_out}$ is greater than the predetermined value, then the algorithm determines that a stack overheating condition may be occurring, from, for example, pump failure, cooling fluid loss in the system, or possible cooling fluid outlet temperature sensor failure at box 98. The algorithm then will report the incident to the vehicle diagnostics system, and shut the fuel cell stack down. If the calculated average temperature $T_{ec,avg}$ is less than the cooling fluid outlet temperature measurement $T_{stack\_out}$ and/or the calculated average temperature $T_{ec,avg}$ minus the cooling fluid outlet temperature $T_{stack\_out}$ is less than 5° C., then the algorithm determines that the stacks 12 and 14 are not overheating, and continues with a normal run mode at box 100.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining whether a fuel cell stack is overheating, said method comprising:
   measuring the temperature of end cells in the fuel cell stack;
   measuring the temperature of a cooling fluid being output from the fuel cell stack using a cooling fluid outlet temperature sensor; and
   determining if the fuel cell stack may be overheating based on the temperature of the cooling fluid and the temperature of the end cells, wherein determining that the fuel cell stack may be overheating includes determining if an average end cell temperature is greater than the measured cooling fluid outlet temperature and the average end cell temperature minus the measured cooling fluid outlet temperature is greater than a predetermined temperature value.

2. The method according to claim 1 wherein determining if the fuel cell stack may be overheating includes determining that the fuel cell stack may be overheating if the average end cell temperature minus the measured cooling fluid outlet temperature is greater than 5° C.

3. The method according to claim 1 further comprising disabling end cell heaters prior to using the temperature of the end cells.

4. The method according to claim 1 wherein the fuel cell stack is a split stack, and wherein measuring the temperature of end cells in the fuel cell stack includes measuring four temperatures including two temperatures from the end cells of one split stack and two temperatures of the end cells of another split stack.

5. A method for determining whether a fuel cell stack is overheating, said method comprising:
   measuring the temperature of end cells in the fuel cell stack;
   measuring the temperature of a cooling fluid being output from the fuel cell stack using a cooling fluid outlet temperature sensor; and
   determining if the fuel cell stack may be overheating based on the temperature of the cooling fluid and the temperature of the end cells, wherein determining if the fuel cell stack may be overheating includes calculating an average end cell temperature from the temperature of the end cells, determining if any of the end cell temperatures are outlying by comparing each end cell temperature to the average end cell temperature, and recalculating the average end cell temperature without the outlying temperature measurements, and wherein determining if the fuel cell stack may be overheating further includes determining that a measured end cell temperature is outlying if the difference between the end cell temperature and average end cell temperature is greater than 5° C.

6. The method according to claim 5 further comprising disabling end cell heaters prior to using the temperature of the end cells.

7. The method according to claim 5 wherein the fuel cell stack is a split stack, and wherein measuring the temperature of end cells in the fuel cell stack includes measuring four temperatures including two temperatures from the end cells of one split stack and two temperatures of the end cells of another split stack.

8. A method for determining whether a fuel cell stack is overheating, said method comprising:
   measuring the temperature of end cells in the fuel cell stack;
   measuring the temperature of a cooling fluid being output from the fuel cell stack using a cooling fluid outlet temperature sensor; and
   determining if the fuel cell stack may be overheating based on the temperature of the cooling fluid and the temperature of the end cells, wherein determining if the fuel cell stack may be overheating includes determining that the cooling fluid outlet temperature sensor has possibly failed if the measured cooling fluid outlet temperature is greater than an average end cell temperature and the measured cooling fluid outlet temperature minus the average end cell temperature is greater than a predetermined temperature value.

9. The method according to claim 8 wherein determining if the fuel cell stack may be overheating includes determining that the cooling fluid outlet temperature sensor has possibly failed if the cooling fluid outlet temperature minus the average end cell temperature is greater than 3° C.

10. The method according to claim 8 further comprising disabling end cell heaters prior to using the temperature of the end cells.

11. The method according to claim 8 wherein the fuel cell stack is a split stack, and wherein measuring the temperature of end cells in the fuel cell stack includes measuring four temperatures including two temperatures from the end cells of one split stack and two temperatures of the end cells of another split stack.

12. A method for determining whether a fuel cell stack is overheating, said method comprising:

measuring the temperature of a cooling fluid being output from the fuel cell stack using a cooling fluid outlet temperature sensor;

measuring the temperature of end cells in the fuel cell stack;

calculating an average end cell temperature based on the end cell temperature measurement;

determining if any of the measured end cell temperatures are outlying temperature measurements by comparing each end cell temperature measurement to the average end cell temperature measurement;

recalculating the average end cell temperature without the outlying end cell temperature measurements;

comparing the measured cooling fluid outlet temperature to the average end cell temperature measurement;

determining that the cooling fluid outlet temperature sensor has possibly failed if the measured cooling fluid outlet temperature is greater than the average end cell temperature measurement and the measured cooling fluid outlet temperature minus the average end cell temperature measurement is greater than a first predetermined temperature value; and determining that the fuel cell stack may be overheating if the average end cell temperature measurement is greater than the measured cooling fluid outlet temperature and the average end cell temperature measurement minus the measured cooling fluid outlet temperature is greater than a second predetermined temperature value.

13. The method according to claim 12 wherein the fuel cell stack is a split stack, and wherein measuring the temperature of end cells in the fuel cell stack includes measuring four temperatures including two temperatures from the end cells of one split stack and two temperatures of the end cells of another split stack.

14. The method according to claim 12 further comprising disabling end cell heaters in the end cells of the fuel cell stack prior to measuring the temperature of the end cells.

15. The method according to claim 12 wherein determining if any of the measured end cell temperatures are outlying includes determining that an end cell temperature measurement is outlying if the difference between the end cell temperature measurement and the average end cell temperature measurement is greater than 5° C.

16. The method according to claim 12 wherein determining that the cooling fluid outlet temperature sensor has possibly failed includes determining that the cooling fluid outlet temperature sensor has possibly failed if the cooling fluid outlet temperature minus the average end cell temperature measurement is greater than 3° C.

17. The method according to claim 12 wherein determining if the fuel cell stack may be overheating includes determining that the fuel cell stack may be overheating if the average end cell temperature measurement minus the measured cooling fluid outlet temperature is greater than 5° C.

* * * * *